United States Patent [19]
Ju

[11] Patent Number: 5,820,202
[45] Date of Patent: Oct. 13, 1998

[54] VEHICLE FRAME REINFORCING BEAM FOR ABSORBING IMPACT

[75] Inventor: Su-Il Ju, Ulsan, Rep. of Korea

[73] Assignee: Hyundai Motor Company, Soul, Rep. of Korea

[21] Appl. No.: 721,014

[22] Filed: Sep. 26, 1996

[30] Foreign Application Priority Data

Sep. 28, 1995 [KR] Rep. of Korea ................ 1995-32287

[51] Int. Cl.⁶ ........................................................ B60J 5/04
[52] U.S. Cl. ..................... 296/146.6; 296/188; 296/189; 296/205; 52/731.6; 52/732.1
[58] Field of Search ..................... 293/122, 126, 293/128, 147, 152, 153; 296/146.6, 188, 189, 205; 52/731.6, 720.1, 720.3, 730.1, 731.2, 732.2, 731.4, 732.3, 732.1; 49/502; 256/13.1

[56] References Cited

U.S. PATENT DOCUMENTS

| | | | |
|---|---|---|---|
| 3,829,149 | 8/1974 | Stevens | 293/128 X |
| 4,978,562 | 12/1990 | Wycech | 296/146.6 X |
| 5,255,487 | 10/1993 | Wieting et al. | 296/188 X |
| 5,277,469 | 1/1994 | Klippel | 296/146.6 |

FOREIGN PATENT DOCUMENTS

| | | | |
|---|---|---|---|
| 271788 | 8/1928 | Italy | 293/122 |
| 5-35420 | 5/1993 | Japan . | |

Primary Examiner—D. Glenn Dayoan
Assistant Examiner—Jason Morrow
Attorney, Agent, or Firm—Finnegan, Henderson, Farabow, Garrett & Dunner, L.L.P.

[57] ABSTRACT

An vehicle frame reinforcing beam for absorbing an impact applied thereto, which is capable of effectively absorbing an impact applied thereto and evenly distributing the impact. In addition, the vehicle frame reinforcing beam is not easily broken with respect to the impact applied thereto. The vehicle frame reinforcing beam includes an inner and outer panel of a vehicle door, an elliptical outer pipe having a longer distance and shorter distance, with a predetermined portion of the elliptical outer pipe being fixedly attached to a portion of the outer panel, and a circular inner pipe having a predetermined outer diameter, with the circular inner pipe being fixedly inserted within the elliptical outer pipe, where the outer diameter of the circular inner pipe is identical to the shorter distance of the elliptical outer pipe.

4 Claims, 2 Drawing Sheets

VEHICLE FRAME REINFORCING BEAM FOR ABSORBING IMPACT

BACKGROUND OF THE INVENTION

1. Field of the Invention

The present invention relates to a vehicle frame reinforcing beam for absorbing an impact applied thereto, and particularly to an improved vehicle frame reinforcing beam which is capable of effectively absorbing an impact applied thereto when a vehicle accident occurs, thus preventing any injury to occupants in the vehicle.

2. Description of the Conventional Art

Generally, as shown in FIGS. 1 and 2, a conventional impact absorbing beam 6 of a door is arranged at an inner portion of an outer panel 2.

The conventional impact absorbing beam 6 is formed of a hollow metal pipe having a high cross-sectional area coefficient so as to enhance its strength with respect to a unit weight of the vehicle and includes a sealer 3. Sealer 3, acting as a seal, secures the conventional absorbing beam 6 to the outer panel 2 so that the outer panel 2 can safely support the frame when the outer panel 2 is bent inside the vehicle by an externally applied impact.

In many countries, there are various regulations for reinforcing the strength of the vehicle so as to protect the occupants in the vehicle when a vehicle accident occurs. In order to improve the strength of the vehicle frame with respect to the vehicle accident, the strength with respect to the externally applied impact must be increased by making the diameter of the pipe of the impact absorbing beam 6 greater or the thickness of the impact absorbing beam thicker.

However, when the diameter of the pipe of the impact absorbing beam 6 is made greater, the space inside the vehicle and the space between inner and outer frames in which a window operation mechanism is arranged must be decreased. In addition, it is difficult to obtain the installation position of the bigger pipe of the impact absorbing beam 6. Moreover, when the thickness of the pipe of the impact absorbing beam 6 is made thicker, it causes a weakness with respect to the externally applied impact, and thus the frame can be easily broken or bent by the impact applied thereto.

SUMMARY OF THE INVENTION

Accordingly, it is an object of the present invention to provide a vehicle frame reinforcing beam for absorbing an impact applied thereto, which overcomes the problems encountered in the conventional vehicle frame reinforcing beam for absorbing an impact applied thereto.

It is another object of the present invention to provide an improved vehicle frame reinforcing beam for absorbing an impact applied thereto, which is capable of effectively absorbing an impact applied thereto and evenly distributing the impact. In addition, the vehicle frame reinforcing beam is not easily broken with respect to the impact applied thereto.

To achieve the above objects, there is provided a vehicle frame reinforcing beam for absorbing an impact applied thereto, which includes a door lower frame formed between inner and outer panels of a vehicle door, an elliptical outer pipe having a major axis and a minor axis, where the major axis has a longer distance and the minor axis has a shorter distance, with a predetermined portion of the elliptical outer pipe being fixedly attached to a portion of the outer panel, and a circular inner pipe having a predetermined outer diameter, the circular inner pipe being fixedly inserted within the elliptical outer pipe, and with the outer diameter of the circular inner pipe being identical to the shorter distance of the elliptical outer pipe.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
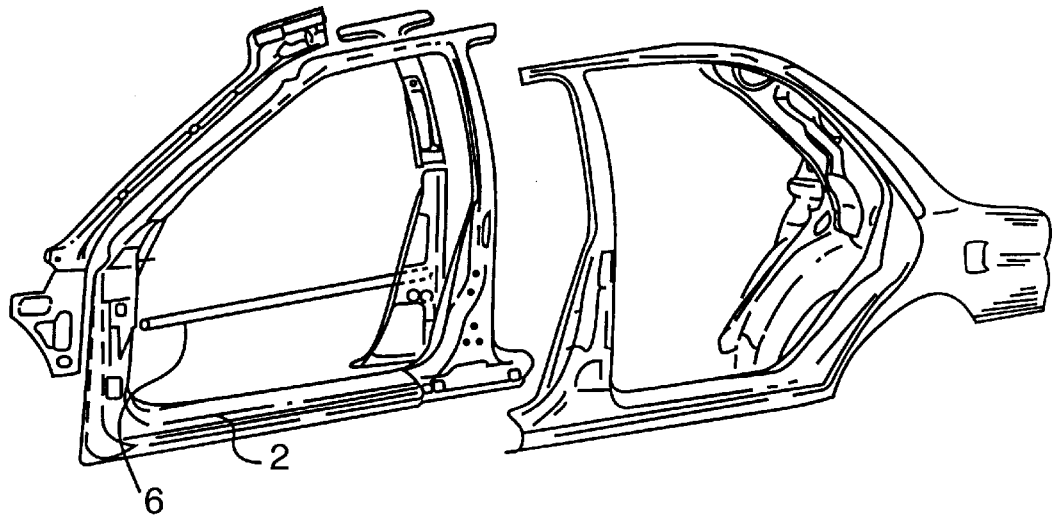
FIG. 1 is a partial perspective view illustrating the installation position of a conventional impact absorbing beam of a vehicle.
Figure 2:
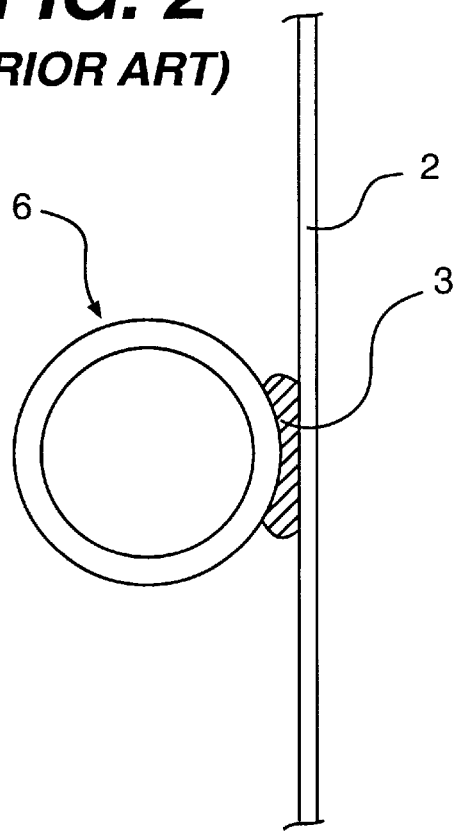
FIG. 2 is a cross-sectional view illustrating a conventional impact absorbing beam.
Figure 3:
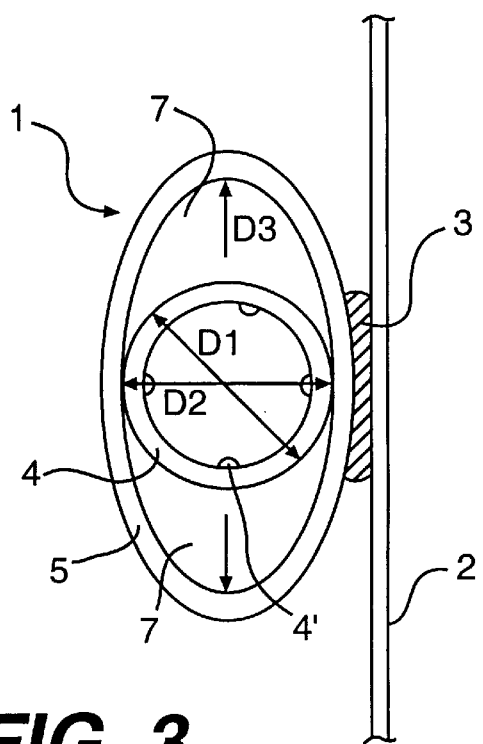
FIG. 3 is a side cross-sectional view illustrating an impact absorbing beam according to the present invention.
Figure 4:
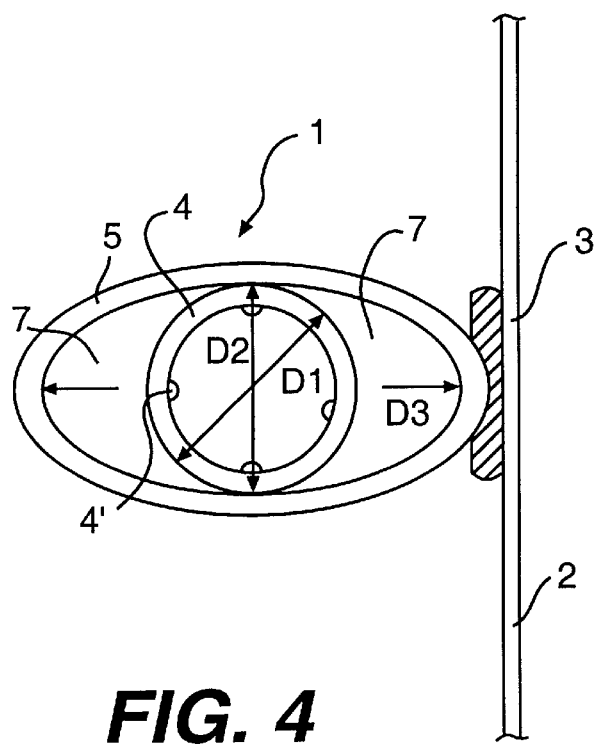
FIG. 4 is a side cross-sectional view illustrating an impact absorbing beam according to the present invention.

FIG. 3 is a side cross-sectional view illustrating an impact absorbing beam according to the present invention. As shown therein, the impact absorbing beam 1, preferably made of a metallic material, for a vehicle is directed to a double pipe structure comprising an elliptical outer pipe 5 having a major axis and a minor axis, where the major axis has a longer distance D3 and the minor axis has a shorter distance D2 and a circular inner pipe 4 tightly inserted within the elliptical outer pipe 5 and having an outer diameter of D1. A portion of the outer circumferential surface of the elliptical outer pipe 5 is fixedly attached to a portion of the outer panel 2 in cooperation with a sealer 3. Sealer 3, acting as a seal, secures the impact absorbing beam 1 to the outer panel 2 so that the outer panel can safely support the impact absorbing beam 1 when the outer panel 2 is bent by an externally applied impact.

Here, the distance D2 of the elliptical outer pipe 5 is the same as the outer diameter D1. A predetermined shaped space 7 is defined between the inner circumferential surface of the elliptical outer pipe 5 and the outer circumferential surface of the circular inner pipe 4, with the predetermined shaped space 7 acting a buffer for effectively absorbing any impact applied to the impact absorbing beam 1.

The longer distance D3 of the elliptical outer pipe 5 is parallel to the surface of the outer panel 2, and the circular inner pipe 4 includes a plurality of spaced-apart protrusions 4' formed at the inner circumferential surface of the same so as to enhance the strength of the circular inner pipe 4.

Here, if there is formed a predetermined space between the outer panel 2 and the door inner panel, the longer distance D3 of the elliptical outer pipe 5 may be vertical with respect to the surface of the outer panel 2.

The vehicle frame reinforcing beam for absorbing an impact according to the present invention is directed to adapting the elliptical outer pipe 5 so as to more effectively absorb the impact externally applied thereto and prevent any bending of the impact absorbing beam 1 based on the following conditions.

The strength of the cross-sectional coefficient of a structure can be expressed as $\delta = M/Z$, where $\delta$ denotes a stress of the structure, M denotes a moment, and Z denotes a cross-sectional coefficient.

In the above expression, when the moment is constant, when the cross-sectional coefficient Z is greater, the inner stress δ of the structure is decreased.

Meanwhile, the cross-sectional coefficient of the structure differs in accordance with the cross-sectional area and shape of the structure. The cross-sectional coefficient $Z_1$ of a first circular hollow pipe is obtained by the following expression.

$$Z_1 = \frac{\pi}{32} * \frac{d_2{}^4 * d_1{}^4}{d_2}$$

In addition, the cross-sectional coefficient $Z_2$ of an elliptical hollow pipe is obtained by the following expression.

$$Z_2 = \frac{\pi}{4a_2} * (a_2{}^3 b_2 - a_1{}^3 b_1)$$

where $d_1$ denotes the inner diameter of the circular hollow pipe, $d_2$ denotes the outer diameter of the circular hollow pipe, $a_1$ denotes the distance which is one-half of the inner longer distance of the elliptical hollow pipe, $a_2$ denotes the distance which is one-half of the outer longer distance of the elliptical hollow pipe, $b_1$ denotes the inner radius of the elliptical hollow pipe, $b_2$ denotes the outer radius of the elliptical hollow pipe, and $T_1$ denotes the thickness "$(d_2-d_{1/2}=b_2-b_1)$" of the circular hollow pipe and the elliptical hollow pipe.

Here, the cross-sectional coefficient $Z_3$ of a second circular elliptical pipe wherein $d_3=d_1$, $d_4=2b_2$, and $T_2=2T_1$ is compared with the cross-sectional coefficient $(Z_1+Z_2)$ of the first circular pipe and elliptical pipe. As a result of the above comparison, the following expression is obtained.

$$Z_1+Z_2>Z_3 \qquad \text{formula I}$$

As seen from formula I, when setting the thickness $2T_1$ of the first circular pipe and elliptical pipe to be the same as the thickness $T_2$ of the second circular pipe, the longer distance $2b_2$ of the elliptical pipe must be smaller than the outer diameter $d_4$ of the second circular pipe so that both cross-sectional coefficients can be identical. Therefore, the double pipe structure comprising the elliptical pipe and the circular pipe is preferably used when there is formed a smaller space between the inner and outer door panels.

Meanwhile, in the case of the circular pipe, a strong impact is laterally applied to the pipe, namely, in the vertical direction with respect to the axis of the pipe, the pipe is more easily broken than it is bent because the inner space to which the impact of the pipe is directly applied is quickly reduced, and the outer side is quickly elongated. Therefore, the reducing side is bent toward the hollow side in response to the impact, and the outer side is torn out before absorbing the impact. The vehicle frame reinforcing beam for absorbing an impact according to the present invention is directed to providing an elliptical outer pipe which is capable of distributing the impact in the longer distance direction of the elliptical outer pipe, and then deforming the circular inner pipe to the predetermined shaped space 7, thus effectively absorbing the impact applied to the beam.

Here, even though the circular inner pipe 4 (or the elliptical outer pipe) is broken by the externally applied impact, both the circular inner pipe 4 and the elliptical outer pipe 5 can not be easily broken at the same time. Thus, the impact absorbing beam effectively absorbs the impact in cooperation with the elongated absorbing time.

In the case of the single pipe structure, the thicker the thickness of the pipe, the easier the pipe can be broken by the impact applied thereto. Any crack occurred at a portion of the pipe may quickly cause another crack. However, since the present invention is directed to a double pipe structure comprising the circular inner pipe 4 and the elliptical outer pipe 5 which are separated from each other in their construction, any crack occurring at a portion of either the circular inner pipe 4 or the elliptical outer pipe 5 does not easily cause another crack due to the separation of the circular inner pipe 4 and the elliptical outer pipe 5 from each other in their constructions. In addition, since the circular inner pipe 4 is fixedly inserted within the elliptical outer pipe 5, both are not easily broken, and the deformation force caused by the impact externally applied to the pipes is effectively absorbed by the predetermined shaped space 7 defined between the inner circumferential surface of the elliptical outer pipe 5 and the outer circumferential surface of the circular inner pipe 4 by withstanding a predetermined deformation time, for thus increasing the impact absorption effect of the vehicle frame reinforcing beam according to the present invention to more than the impact absorption effect of a structure of two circular pipes coaxially formed.

As described above, the vehicle frame reinforcing beam for absorbing an impact according to the present invention is capable of evenly distributing the impact in cooperation with the impact delay time and protecting occupants in the vehicle by the increased strength of the vehicle frame. In addition, the inner space of the vehicle is not changed by the installed beam of the present invention. Moreover, it is easy to control the installation position of the beam of the present invention. In addition, since the shorter distance of the elliptical outer pipe is the same as the diameter of the circular inner pipe, the space inside the vehicle is not changed thereby.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A vehicle frame reinforcing beam formed between inner and outer panels of a vehicle door for absorbing an impact, the vehicle frame reinforcing beam comprising:

an elliptical outer pipe between inner and outer panels of the vehicle door, the elliptical outer pipe having an inside major axis length and a shorter inside minor axis length; and a circular inner pipe having an outside diameter, and fixed within the elliptical outer pipe, the outside diameter of the circular inner pipe being substantially identical to the inside minor axis length of the elliptical outer pipe.

2. The beam of claim 1, wherein the inside major axis length of said elliptical outer pipe is vertically arranged.

3. The beam of claim 1, wherein the inside major axis length of said elliptical outer pipe is horizontally arranged.

4. A vehicle frame reinforcing beam formed between inner and outer panels of a vehicle door for absorbing an impact, the vehicle frame reinforcing beam comprising:

an elliptical outer pipe formed between inner and outer panels of the vehicle door; and a circular inner pipe fixed within the elliptical outer pipe.

* * * * *